United States Patent Office 3,434,502
Patented Mar. 25, 1969

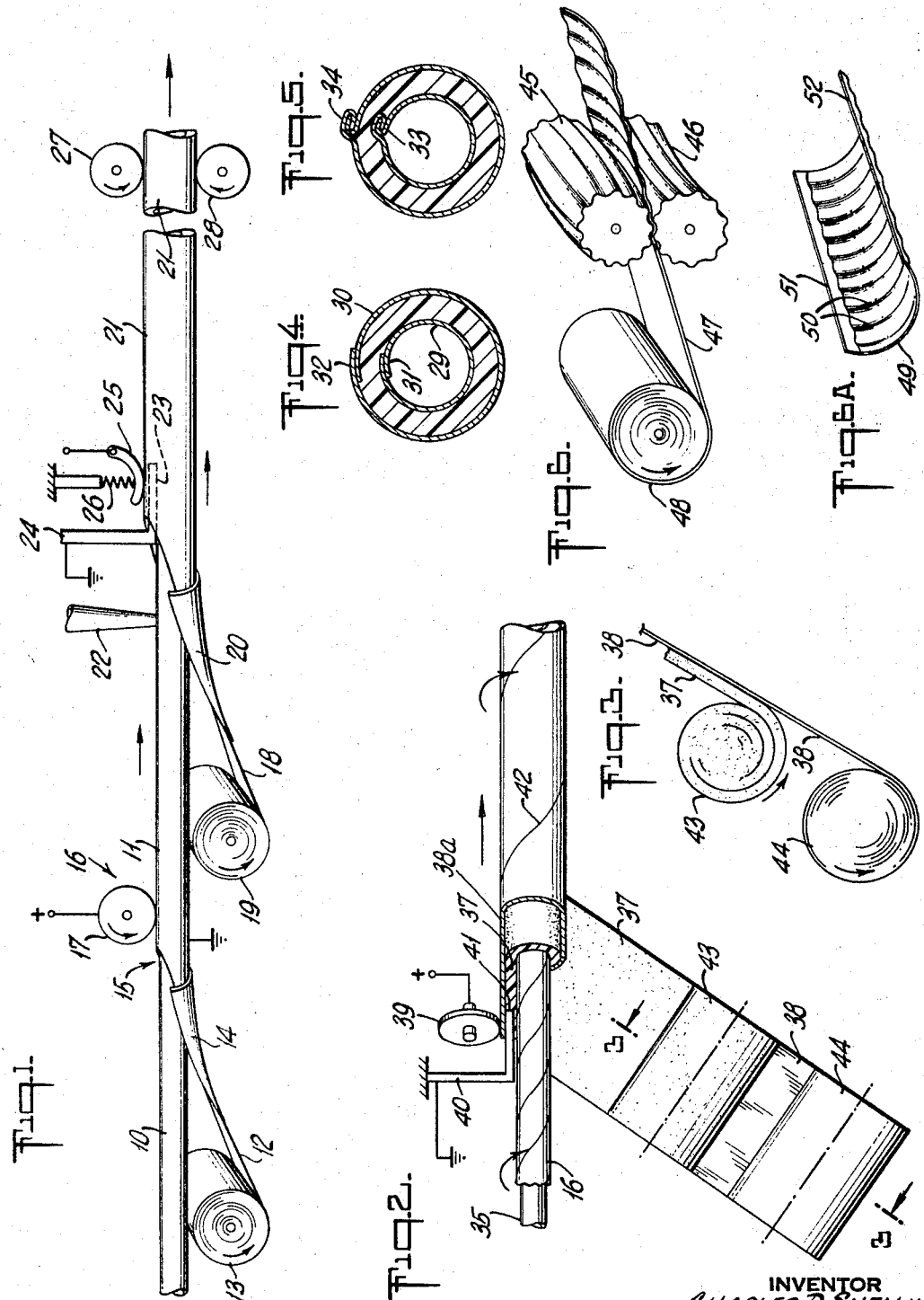

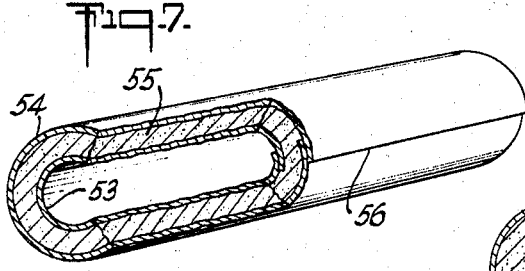
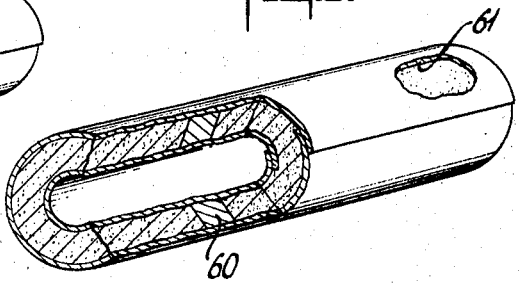
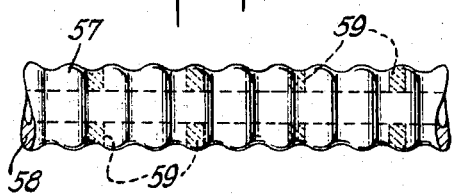
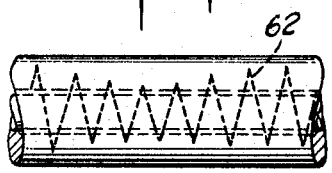
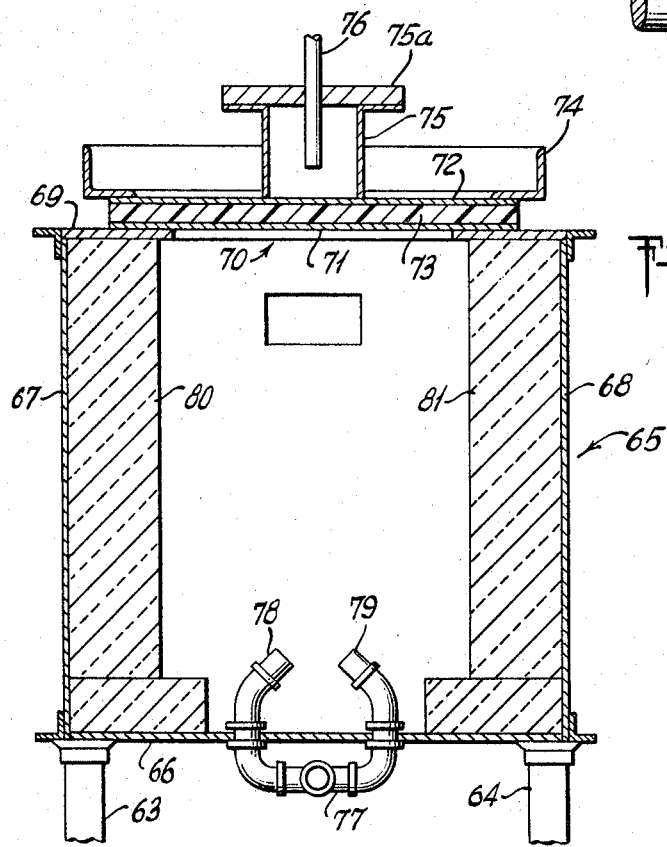

3,434,502
FLEXIBLE FIRE RESISTANT AIR DUCT
Charles D. Snelling, 2949 Greenleaf St.,
Allentown, Pa. 18104
Filed May 22, 1967, Ser. No. 639,958
Int. Cl. F16l 11/00, 11/14; D03d 49/26
U.S. Cl. 138—129
9 Claims

ABSTRACT OF THE DISCLOSURE

The flexible heating and air conditioning duct is disclosed comprising an inner wall and an outer wall concentrically surrounding the inner wall and defining an annulus therebetween. The annulus has confined in it throughout its cross section insulating material, both walls being made of flexible material, at least one wall being formed of metal foil to resist heat at said foil side.

---

This invention relates to an air duct and, in particular, to a flexible fire resistant air duct comprised of inner and outer walls with an annulus therebetween having confined therein material having insulating properties.

A long-felt need has existed for a light, durable, flexible, fire-resistant conduit or duct for conveying hot or cold air for use in space heating or cooling. Plastic foams have come into increasing use as insulating material for ducts and the like. Such foams, especially urethane, are light, inexpensive, and durable and easy to mold in place into any configuration desired. A method for using expanded plastics or foams in the manufacture of conduits is disclosed in my U.S. Patent No. 3,118,800, granted on January 21, 1964.

Ducts proposed heretofore have generally been substantially non-metallic in construction, but such ducts have not been very successful in meeting the standards of the National Fire Protection Association. Plastic foams are desirable as insulating material because of their extreme lightness, but they have the disadvantage of being quite flammable and produce great quantities of smoke. This problem has confronted the entire industry and many attempts have been made to produce a light, low cost, flexible air duct that will receive underwriter approval in accordance with the standards of the National Fire Protection Association. Attempts at using aluminum foil as a fire resistant wall were not successful as aluminum has a relatively low melting point.

According to the requirements for a substantially fireproof air duct, the duct must be capable of retarding the passage of flame for a period of at least 30 minutes in the case of a class 1 air duct or for at least 15 minutes in the case of a class 2 air duct. In the fire penetration test, a gas-fired furnace is employed having an open top upon which is supported a test sample, which is generally in the form of a sandwich of at least 18 inches square. The material surface which is considered to be the outside surface of the air duct is the surface exposed to the flame during the test. The test sample is weighted around its periphery to the furnace roof surrounding the opening using a frame or other suitable means. During the test, the sample is subjected to a static load of 2 pounds per square inch over an area of 1 by 4 inches located at the geometric center on the upper surface of the part exposed to the flame. The gas input to the furnace (note FIG. 11) is such as to obtain a fuel input corresponding to 54,500±500 B.t.u.'s per hour. Generally the temperature is in the range of about 900° F. to 1200° F. After the furnace has been brought to a steady state condition, the sample is placed in position, and the test period measured from the time the static load is applied to the test sample.

The sample must withstand the flame penetration test without collapse.

The foregoing test is a rigid and exacting one. Prior to the making of my invention, the industry was still looking for a satisfactory light weight, fire resistant economical duct capable of meeting the aforementioned standard.

I have now found that I can provide an improved light weight air duct wherein plastic foam may be employed as the insulating material and still be sufficiently fire resistant for the purpose intended. In addition, I have found that other insulating materials may be employed and still insure the necessary fire resistance, provided that at least one of the surfaces of the duct is made of light weight, high melting point, flame-resistant, flexible material.

It is thus the object of my invention to provide a flexible, fire resistant air duct.

An object is to provide a flexible, fire resistant air duct having inner and outer walls defining an annular space having insulating material confined therein.

These and other objects will more clearly appear when taken in conjunction with the disclosure and the accompanying drawings, wherein:

FIGS. 1 to 3 are illustrative of methods which may be employed in producing the air duct provided by the invention;

FIGS. 4 and 5 depict in cross section embodiments of air ducts showing different means of sealing the inner and outer walls;

FIG. 6 shows a means for producing shallow corrugations in thin steel strip in preparation for forming the strip into a tubular shape;

FIG. 6A shows one form of corrugated strip with undeformed marginal edges;

FIGS. 7 to 10 are illustrative of various embodiments of air ducts provided by the invention; and FIG. 11 depicts a furnace employed in carrying out a flame penetration test on a test sample.

In its broad aspects, the invention comprises a flexible heating and air conditioning duct comprising a continuous inner wall and a continuous outer wall concentrically surrounding the inner wall and defining an annulus between said walls. The annulus has confined in and throughout its cross section an insulating material. Both walls are made of flexible material, at least one of the walls being formed of thin steel foil or other foil with melting temperature of at least 2000° F., to confer fire-resistant properties to the foil side of the duct.

Advantageously, both walls are made of steel foil, the foil having a thickness which enables the duct to flex and negotiate changes in direction during installation. The foil thickness may range from about one-half of a thousandth to about 0.005 inch, and generally from about 0.001 to about 0.003 inch. For ease of fabrication, the steel foil should be dead soft or annealed. Since the steel foil must meet a corrosion resistant standard, it may be coated with tin or with a thin layer of plastic.

The inner and outer walls are produced from steel foil by forming strip foil into a tubular shape, the tube being sealed by means of lap, seam or spot welding; or the butt ends of the formed strip can be folded over each other to form a crimped lock seal. Where fire resistance is not a problem, the strip may be sealed by using solder in the manner used by the canning industry, or the seal may be an adhesive, e.g., epoxy resin.

After the inner tubular wall is made, foam plastic, e.g., urethane foam, may be molded about it and within the annulus formed by the outer wall. The foam plastic may have molded within it a spirally shaped steel wire to provide spring reinforcement in order to maintain the shape, size and strength of the duct and to provide the necessary flexibility.

Where desirable, the steel foil may have shallow corrugations such that when formed into a tube, the corrugations run circumferentially about the tube and confer added flexibility to the air duct to enable it to negotiate corners during installation.

While it is advantageous to use foam plastic as the insulating material, since it can be provided over a wide range of densities, e.g., 1 to 40 lbs. per cubic foot or more advantageously from 1 to 6 lbs., other materials that may be used include fiber glass, rock wool and the like. Although fiber glass itself is not flammable, attempts to provide it with a flame penetration proof outer covering heretofore has not been very successful.

Various methods may be employed in producing the duct of the invention. One method is that disclosed in my U.S. Patent No. 3,118,800. In producing an air duct using foam plastic as the insulating material, reference is made to FIG. 1 which shows a mandrel 10 supported by means not shown, around which is formed a tubular element or inner wall 11 of steel foil. The steel foil 12 is drawn off capstan or roll 13 and through a funnel shaped forming die 14 located slightly below and partially around mandrel 10 where the foil is gradually formed circumferentially to surround the mandrel as shown. When the foil laps itself coming out of the die at 15, a welding assembly is provided as shown diagrammatically and designated generally by the numeral 16. The assembly comprises a rotatable copper wheel or electrode 17 coupled to a source of current as shown, the formed steel tubing 11 being grounded to complete the circuit. The copper electrode is pulsed at short time intervals to form closely spaced welds along the length of tubular element 11. As welded tubing 11 moves along and leaves the mandrel, another steel foil tubing 21 is being formed substantially concentrically around it. A roll or capstan 19 is provided from which steel foil 18 is drawn then shaped by forming die 20 into a tube 21 as shown. As the foil is being formed, a foaming plastic mix is ejected from a nozzle 22 on the foil strip as it is being formed at the trough end of the die. As the strip laps over itself, it passes over shoe 23 of grounded electrode 24 and beneath positive electrode 25 which is biased via spring 26 against the strip and back-up shoe 23. As the outer tubular member 21 moves along as shown, pulses of current are passed through electrodes 25 and 24 to effectively lap weld the outer tubing. In the meantime, the plastic foams and expands and fills up the annular space between the inner and outer walls. As the plastic expands, the inner and outer walls tend to align themselves more concentrically. The foam plastic may have a catalyst to accelerate curing or curing may be effected by passing the assembled duct through an oven before it reaches drive rolls 27, 28. The term "foam plastic" as used herein is meant to include any type of expanded plastic, such as expansible styrene beads or cellular polyvinyl chloride expanded by means of a blowing agent.

Instead of seam welding the tubing, the tubing can be sealed or closed by a mechanical lock seam. Examples of seam locks are shown in FIGS. 4 and 5 which are cross sections of the duct provided by the invention. In FIG. 4, both the inner and outer walls 29, 30 are seam jointed by means of lap welds 31 and 32, respectively. Assuming that the outer wall of steel foil is all that is required to assume resistance to fire penetration, then inner wall 29 can be made from other materials, such as aluminum foil, impregnated fire-proof paper, plastic sheathing, and the like.

FIG. 5 differs from FIG. 4 in that the seam is locked by crimping or folding the metal over onto itself as shown by lock seams 33, 34. Means for doing this are well known and can be used in place of welding assemblies 16 and 25 in FIG. 1.

As has been stated above, other types of insulting materials may be employed. Where fiber glass is used as the insulating material, it may be wound around the outer surface of the inner wall in the form of a batting.

This is depicted diagrammatically in FIG. 2 which shows a portion of mandrel 35 around which has been spirally formed inner wall 36 of steel foil at a previous station not shown. The inner wall is spirally welded, although it may be spirally crimped by known means. In the embodiment shown in FIG. 2, the inner wall slides over the mandrel and rotates at the same time until it reaches the next station at which fiber glass batting 37 and foil 38 are simultaneously wound about tube 16, the outer wall of foil 38a being spirally welded via electrodes 39 and 40, the electrode 40 being grounded and having a shoe portion 41 extending beneath the outer strip, electrode 39 bearing down on the outside surface. The assembled elements gradually rotate as they move forward of the mandrel. The outer wall is to form seam weld 42. The manner in which the batting and steel foil are drawn off is shown more clearly in FIG. 3 which is a section taken along line 3—3 of FIG. 2. In FIG. 3, roll 43 of batting 37 and roll 44 of steel foil 38 are drawn off simultaneously so that the steel foil is adjacent the surface of the batting as it is being wound about inner wall 16 shown in FIG. 2.

It has been found advantageous to provide the foil with shallow transverse corrugations prior to forming it into a tube. Such corrugations may range from one-eighth to one-quarter of an inch from crest to crest. In FIG. 6, corrugating rolls 45, 46 are shown impressing corrugations into strip 47 drawn from coil 48. Roll 45 is convexed while roll 46 is concaved in order to produce a concaved strip so that it can more easily be formed into a tube. FIG. 6A shows one form of corrugated strip 49 with shallow corrugations 50 running transverse of the strip but inward of side margins 51 and 52. The flat side margins are provided to provide ease of joining by lap welding or mechanically formed seam locking. The strip is rolled with a concaved shape so that it can be easily formed into a tube.

Referring to FIG. 7, a partial section of an air duct provided by the invention is shown comprising inner and outer walls 53, 54, respectively, of steel foil of about 0.002 inch thick concentrically spaced with foam urethane 55 or fiber glass in the annular space thereof, the duct being seam welded via a lap joint 56 as shown. Such ducts may have an inside diameter of from 1 inch to 3 inches and a wall thickness of ¼-inch to 6 inches. A normal size would be one with a 6 inch inside diameter and one-half inch thick of foam.

In FIG. 8, a corrugated air duct 57 is depicted having an annular space filled with expanded plastic 58, the duct having spaced along the anulus in the direction of the longitudinal axis rings of activated charcoal 59 placed every several feet to absorb and diminish the flow of any smoke through the duct that may form during overheating of the duct.

In FIG. 9, which is similar to FIG. 7, a plurality of smoke interceptors of solid material 60 may be employed along the duct to prevent smoke from flowing through the insulation of the duct, should smoke form during overheating of the duct. One of the advantages of using foam plastic is that the undamaged portion serves as a filter of any smoke flowing through it, thereby inhibiting the flow of smoke along the conduit. The outer surface of the foil in FIG. 9 is broken away to show it is coated with a corrosion resisting coating 61 of, for example, tin, plastic, zinc, etc.

FIG. 10 is an embodiment of the duct provided by the invention utilizing a spring element 62 as a reinforcement member embedded in the insulation, for example, a foam plastic insulation.

FIG. 11 is illustrative of a flame penetration device which may be employed in testing sandwiches comprising the elements used in the duct. The furnace is supported by legs 63, 64. The body of the furnace 65 is comprised of a base plate 66, side plates 67, 68 and a cover plate plate 69 having an opening 70 therein for exposing a face of the test sample to the heating chamber of the furnace. A test sample comprising steel foil layers 71 and 72 having sandwiched therebetween insulation 73, e.g. urethane foam, is positioned over the opening as shown, the sample being held in place by a frame 74 which bears on the marginal periphery of the test sandwich, the test sandwich being at least 18 inches square, the top opening of the furnace being approximately 13½ inches square. Centrally located at the center of the sandwich is a weight supporting assembly 75 with a load 75a to which is coupled a rod for removing and applying load 75a. A burner 77 is provided at the bottom of the furnace with a pair of nozzles 78 and 79. The furnace is lined with refractory walls 80, 81, the combustion chamber being about 13½ inches square and about 20 inches high. As has been stated, the static load 75a should be sufficient to apply a weight of 2 lbs. per square inch over an area 1 by 4 inches and the heat input should correspond to 54,500± 500 B.t.u.'s per hour.

After trying different materials, e.g. aluminum foil, paper, vinyl, polyethylene, asbestos paper, asbestos cloth, chemically treated materials, fire retardant foam and the like, applicant discovered an improved combination of elements which meets the stringent requirements of fire resistance. The finished product is extremely light, very strong, and, in addition, very rugged. It can be made very flexible to the extent that it can be doubled on itself without damage or rupture. The steel foil does not interfere with the normal and expected properties of the foam plastic.

Actual tests with both hard and soft propane torch flames have demonstrated that even with steel foil about 0.001 inch thick, the flame will not penetrate the duct. In conventional foam ducts made prior to this invention, a hard propane flame almost immediately penetrates the outer covering of the ducts and generally sets them afire. The flame then melts and ignites the foam interior, which burns with a thick acrid smoke. Within a very short time, e.g., a minute, such a flame will penetrate through the interior wall and into the core of the flexible conventional duct whereby melted foam will drop out of the duct. Most conventional ducts will continue burning after removal of the flame until the duct is practically destroyed. As will be apparent, air blown through such a duct might carry fire and smoke into distant parts of a building.

In accordance with my invention, the flame fails to penetrate the outer foil layer of the duct, even after extended periods of time. Tests have shown that the foam on the other side of the foil melts, but the insulation effect is still sufficient to prevent the high temperature from extending into the center of the duct. The smoke is confined within the annular space between the two foil surfaces and is absorbed within the undamaged foam. It has been observed that even when the outer wall is heated to a bright red heat, it does not cause a fire within the walls of the duct because there is no oxygen present to support combustion. It is thus apparent that the invention provides a duct which can be used with safety in homes, apartments and commercial buildings. When plastic foams are employed as the insulating material, their tendency towards combustion can be further minimized by incorporating fire proof chemicals with the foam. Such chemicals or fire retardants may comprise bromine, chlorine, or fluorine chemically bonded to the plastic foam molecular structure.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A flexible heating and air conditioning duct comprising a continuous inner wall, a continuous outer wall concentrically surrounding said inner wall and defining an annulus therebetween, said annulus having confined therein throughout its cross section an insulating material, both walls being made of flexible material, at least one of said walls being formed of metal foil of thickness ranging from about 0.0005 to 0.005 inch having a melting point of at least about 2000° F. to confer fire-resistant properties to said duct at the foil side.

2. The flexible duct of claim 1, wherein the foil forming one of said walls is steel.

3. The flexible duct of claim 1, wherein the foil has a thickness of about 0.001 to 0.003 inch.

4. The flexible duct of claim 1, wherein both walls of the duct are made of steel foil.

5. The flexible duct of claim 4 wherein the walls of the duct have a series of corrugations running circumferentially around the duct.

6. The flexible duct of claim 4, wherein the insulating material is foam plastic having a density ranging from about 1 lb. to 6 lbs. per cubic foot.

7. The flexible duct of claim 6 wherein the duct has embedded in the annulus of foam plastic a coiled spring helically surrounding the inner wall.

8. The flexible duct of claim 4 wherein the annulus of the duct has spaced along its length means for inhibiting the flow of smoke along the annulus.

9. The flexible duct of claim 4 wherein the steel foil has a thickness ranging from about 0.001 to 0.003 inch.

References Cited

UNITED STATES PATENTS

| 2,936,792 | 5/1960 | MacCracken et al. | 138—131 |
| 3,118,800 | 1/1964 | Snelling | 156—79 |
| 3,366,719 | 1/1968 | Lueders | 156—79 |

HENRY S. JAUDON, *Primary Examiner.*

U.S. Cl. X.R.

138—133; 139—149; 159—79